(12) United States Patent
Gardner, Jr.

(10) Patent No.: US 6,457,645 B1
(45) Date of Patent: Oct. 1, 2002

(54) OPTICAL ASSEMBLY HAVING LENS OFFSET FROM OPTICAL AXIS

(75) Inventor: Richard Lynn Gardner, Jr., Greeley, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/290,842

(22) Filed: Apr. 13, 1999

(51) Int. Cl.[7] ................................................. G06N 7/10
(52) U.S. Cl. ............................. 235/462.23; 235/472.01
(58) Field of Search ...................... 235/462.01–462.3, 235/472.01–472.03, 454, 375, 494

(56) References Cited

U.S. PATENT DOCUMENTS

| | | | |
|---|---|---|---|
| 4,877,949 A | * 10/1989 | Danielson et al. | 235/462 |
| 4,894,523 A | 1/1990 | Chadima, Jr. et al. | 235/472 |
| 5,019,699 A | * 5/1991 | Koenck | 235/472 |
| 5,280,161 A | 1/1994 | Niwa | |
| 5,617,489 A | 4/1997 | Adachi | |
| 5,644,559 A | 7/1997 | Christie, Jr. et al. | 369/36 |
| 5,682,096 A | 10/1997 | Christie, Jr. et al. | 324/207.2 |
| 5,697,699 A | 12/1997 | Shuzo et al. | |
| 5,777,321 A | 7/1998 | Kerschner et al. | 250/235 |
| 6,000,612 A | * 12/1999 | Xu | 235/454 |

FOREIGN PATENT DOCUMENTS

EP   0 769 753   4/1997

OTHER PUBLICATIONS

European Search Report on European Patent Application No. 00302303.3, Date of completion of the search Apr. 24, 2002, (2 pages).

* cited by examiner

Primary Examiner—Thien M. Le

(57) ABSTRACT

An improved optical assembly for acquiring an image of an object is disclosed. The optical assembly comprises an illuminator used to illuminate the object and an imaging device used to generate an image of the object. The illuminator has a light source associated with an illuminating lens wherein the illuminating lens has an optical axis. A light beam is generated by the light source and passes through the illuminating lens to illuminate the object. The imaging device has a photosensor associated with an imaging lens wherein the imaging lens has an optical axis. An image beam of light reflects from the object and is focused by the imaging lens onto the photosensor. The light beams associated with the illuminator and the imaging device are steered to intersect at a common point on the object. Steering the light beam is accomplished by spacing the light source a distance from the optical axis of the illuminating lens. Steering the image beam is accomplished by spacing the photosensor a distance from the optical axis of the imaging lens.

21 Claims, 6 Drawing Sheets

OPTICAL ASSEMBLY HAVING LENS OFFSET FROM OPTICAL AXIS

FIELD OF THE INVENTION

The present invention relates generally to optical assemblies and, more particularly, to an optical assembly having an optical device and a lens wherein the optical device is spaced a distance from the optical axis of the lens.

BACKGROUND OF THE INVENTION

An optical assembly uses a lens to focus light associated with an optical device. The optical device may, as examples, be a light source or a photosensor. When the optical device is a light source, the optical assembly may serve as an illuminator in which the lens focuses light emitted by the light source onto an object. When the optical device is a photosensor, the optical assembly may serve is an imaging device in which the lens focuses light reflected from the object onto the photosensor to generate an image of an object. Optical assemblies may be used in a variety of applications, such as electronic scanners and bar code readers, to illuminate objects and to generate images of objects.

Bar codes are used in numerous applications to identify objects to which the bar codes are affixed. Examples of bar codes include the uniform price code used to identify retail goods and various forms of shipping labels used to track parcels. A bar code is an optical symbol containing coded information, in which the symbol is able to be imaged by an imaging device. The imaging device generates an image of the bar code and converts the image to machine-readable image data, referred to herein simply as "image data." The image data is output to a processor, which deciphers the image data representing the bar code to "read" the bar code. Reading the bar code is the operation of deciphering the bar code to obtain the information encoded in the bar code. The information encoded in the bar code may, as an example, identify the object to which the bar code is affixed.

A bar code may, as an example, be a representation of a character set, e.g., ASCII characters represented by binary numbers. One type of bar code format that represents a binary number consists of an array of alternating reflective and nonreflective surfaces in which the transition from one surface to an adjacent surface represents the transition from one bit to another bit of a binary number. The alternating reflective and nonreflective surfaces may, for example, be alternating reflective and nonreflective stripes. The reflective stripes are sometimes referred to herein as spaces and the nonreflective stripes are sometimes referred to herein as bars. The bars may, as an example, be dark-colored stripes and the spaces may, as an example, be light-colored stripes. Each stripe, thus, represents one bit of the binary number. The stripes may, as an example, be either wide or narrow. A wide stripe may represent a one and a narrow stripe may represent a zero. The binary number represented by the bar code is, thus, defined by the widths of the alternating bars and spaces.

The array of alternating bars and spaces in the bar code format described above has numerous different specifications that may apply to the format. The specifications define the numbers of, and widths of, the bars and spaces used to represent the characters used in the format. These specifications also define the reflectivity of the bars and spaces for the various formats. Other bar code formats, may, as examples, comprise two-dimensional arrays of reflective and nonreflective areas or concentric reflective and nonreflective circles. All the bar codes, however, have reflective and nonreflective surfaces.

A bar code reader is a photoelectric device that is used to "read" bar codes. Reading a bar code is the process of analyzing the areas of high and low reflectivity to decipher the information encoded in the bar code. The bar code reader typically comprises an illuminator, an imaging device, and a processor. The illuminator serves to illuminate the bar code via an illumination beam of light. The illuminator may, for example, be a laser or an array of light-emitting diodes. An image beam of light constituting an image of the bar code reflects from the bar code. The imaging device receives the image beam and converts the image of the bar code to image data. The processor analyzes the image data to distinguish the image data representing the reflective spaces from the image data representing the nonreflective bars. Based on the analysis of the image data, the processor is able to decipher the information encoded in the bar code.

The imaging device uses a photosensor, such as a charge-coupled device, often referred to herein simply as a CCD, to convert the image beam to image data. A CCD typically consists of at least one linear array of photodetector elements, referred to herein simply as photodetectors, mounted to a substrate, or etched into a wafer, e.g., a silicon wafer used in semiconductor fabrication. A CCD may, as an example, comprise approximately 2,700 photodetectors in the array wherein the individual photodetectors have a width of approximately 11 microns, thus, making the array approximately three centimeters long and 11 microns wide. The high concentration of photodetectors in the array typically allows a single CCD to image a bar code as described above with enough precision to determine the widths of the reflective and nonreflective surfaces. The CCD typically images a very narrow "scan line" portion of the bar code wherein the scan line transverses the stripes comprising the bar code. The scan line is generally as narrow as the array of photodetectors, e.g., 11 microns.

The illuminator should uniformly illuminate the bar code; otherwise, the processor may be unable to distinguish the reflective areas from the nonreflective areas. For example, if one end of the bar code is more intensely illuminated than the other end of the bar code, the nonreflective areas in the intensely illuminated end may reflect more light than the reflective areas in the less intensely illuminated end of the bar code. The processor will likely be unable to read the bar code because it will not be able to distinguish the non reflective surfaces from the reflective surfaces.

Bar codes, as described above, are sometimes used in autochangers. An autochanger is a device that stores media pieces in a library and moves selected media pieces from the library to a media player when a user requests information stored on the selected media pieces. Likewise, when the user no longer requires the information on a selected media piece, the autochanger moves the media piece from the media player to a specific location in the library. The autochanger uses a media handling device, sometimes referred to herein as a picker, to move selected media pieces between the library and the media players. Bar codes may be affixed to the media pieces and may serve to identify contents of the media pieces. A bar code reader, as described above, may be affixed to the picker and may serve to read the bar codes affixed to the media pieces.

Two objectives in the design of an autochanger are to minimize human involvement required in the operation of the autochanger and to maximize the space available in the autochanger for media storage. Minimizing human involvement required in the operation of the autochanger may, in part, be achieved by the use of bar codes affixed to the media pieces as described above. The autochanger, rather than a human user, may read the bar codes to determine the contents of the media pieces and the locations of the media pieces within the autochanger. The user, thus, only needs to place the media pieces into the library. This minimizes human involvement in the operation of the autochanger and reduces the probability of errors in identifying the contents and locations of the media pieces.

Maximizing the space available for media storage within an autochanger may be achieved, in part, by reducing the amount movement required by the picker, minimizing the size of the components comprising the autochanger, and integrating the components comprising the autochanger into single packages. Reducing the picker movement increases the space available for media storage because media pieces are not able to be stored in the space dedicated to picker movement. Integrating the components comprising the autochanger generally decreases the number of components comprising the autochanger and, thus, increases the space available for media storage. One example of maximizing the space available for media storage in the autochanger is to minimize the size of the bar code reader and to integrate the bar code reader into the picker.

Integrating the bar code reader into the picker presents several problems. Several other components may also be located within the picker, which constricts the space available for the illuminator and the imaging device. These other components may interfere with the light beams associated with the illuminator and the imaging device. The picker may have to be enlarged to accommodate the illuminator and the imaging device, however, this defeats the purpose of minimizing the sizes of the components comprising the autochanger. Another problem with locating the illuminator and the imaging device within the picker is that their light beams must be aligned to intersect at a point external to the picker where a bar code will be located. This alignment is difficult to perform within the tight confines of the picker. A third problem with locating the bar code reader within the picker is that the picker may have to move an extra distance in order for the bar code reader located within the picker to be properly positioned to read a bar code. This extra movement requires space within the autochanger to be dedicated to picker movement rather than to media storage.

Therefore, a need exists for a bar code reader that is able to be located within a picker of an autochanger wherein the picker is neither required to be enlarged to accommodate the bar code reader nor move an extra distance in order for the bar code reader to read a bar code.

SUMMARY OF THE INVENTION

An improved optical assembly is disclosed herein. The improved optical assembly comprises an optical device associated with a lens wherein the lens has an optical axis. The improved optical assembly further comprises a light path extending between a point and the optical device wherein the light path passes through the lens. The light path may be steered to intersect an object by spacing the optical device a distance from the optical axis of the lens.

The improved optical assembly may be used in a bar code reader application. A first optical assembly may be an illuminator in which the lens is and illuminating lens and the optical device is a light source. An illumination beam generated by the light source may be steered to intersect a bar code by spacing the light source a distance from the optical axis of the illuminating lens. A second optical assembly may be an imaging device in which the lens is an imaging lens and the optical device is a photosensor. An image beam associated with the photosensor may be steered to intersect the bar code by spacing the photosensor a distance from the optical axis of the imaging lens.

The improved optical assembly allows the optical devices to be mounted to a single printed circuit board, which may further reduce the size of the device that uses the optical assembly. In a conventional optical assembly, the optical devices cannot be mounted to the same printed circuit board because their light beams would extend parallel and, thus, would not intersect at a point. The optical devices used in the optical assembly disclosed herein may be located on the same printed circuit board by spacing the optical axes of the lenses appropriate distances from the optical devices so that the light beams intersect a common point. This application may be used in a bar code reader so that the light source and the photosensor may be mounted to the same printed circuit board. The illumination beam and the image beam may then be steered to intersect a bar code.

This bar code reader with the illuminator and photosensor mounted to the same printed circuit board may be used in a picker of the type used in an autochanger. The bar code reader is able to fit within the tight confines of the picker by steering the illumination beam and the image beam so as to avoid the other components located within the picker. Additionally, the bar code reader only requires minimal alignment to steer the light beams to intersect a bar code because the illuminator and the imaging device are integrated together within the picker.

DETAILED DESCRIPTION OF THE INVENTION

Figure 1:
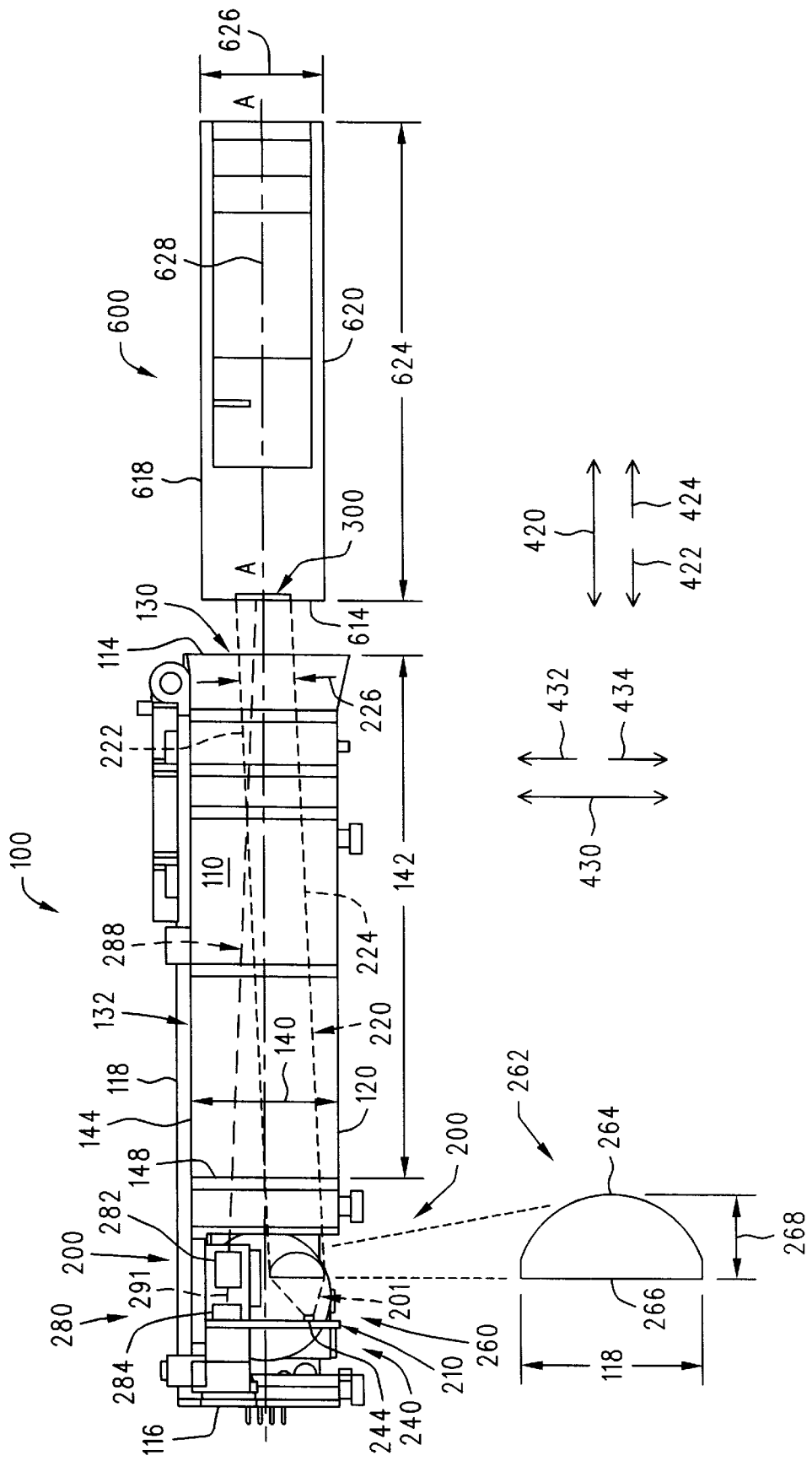
FIG. 1 is a top view of a media handler associated with a digital linear tape cartridge.

FIGS. 1–6 generally illustrate an optical assembly 200 for acquiring an image of an object 300, the optical assembly 200 comprising: a photosensor array 284; an imaging light path 288, 291 extending between the object 300 and the photosensor array 284; an imaging lens 282 located along the imaging light path 288, 291, the imaging lens 282 having an imaging lens optical axis 296 associated therewith; wherein the imaging lens optical axis 296 is spaced a first distance 234 from the photosensor array 284 in a direction normal to the imaging lens optical axis 296.

FIGS. 1–6 also, in general, illustrate an optical assembly 200 for acquiring an image of an object 300, the optical assembly 200 comprising: a light source 240; an illumination light path extending between the light source 240 and the object 300; at least one illumination lens 262 located along the illumination light path, the at least one illumination lens 262 having an illumination lens optical axis 278 associated therewith; wherein the illumination lens optical axis 278 is spaced a first distance 232 from the light source 240 in a direction normal to the illumination lens optical axis 278.

FIGS. 1–6 also, in general, illustrate a method of imaging an object 300, the method comprising: providing a photosensor array 284; providing an imaging lens 282, the imaging lens 282 having an imaging lens optical axis 296 associated therewith, wherein the imaging lens optical axis 296 is spaced a first distance 234 from the photosensor array 284 in a direction normal to the imaging lens optical axis 296; locating the photosensor array 284 relative to the object 300 such that the photosensor array 284 is spaced from the object 300 in a direction normal to the imaging lens optical axis 296; imaging the object 300 with the photosensor array 284 by directing a light path 288, 291 from the object 300 through the imaging lens 282 to the photosensor array 284.

Having thus generally described the bar code reader 200 and a method of reading bar codes in general, the bar code reader 200 and method will now be described in detail.

Referring to FIG. 1, the following description discloses a bar code reader 200 integrated into a media handling device 100 of the type used in an automated media exchanger, not shown. The media handling device 100 is sometimes referred to herein simply as a picker 100. The automated media exchanger is sometimes referred to herein simply as an autochanger. It is to be understood, however, that the bar code reader 200 may be used in other applications where bar codes are utilized. It is to be further understood that the concepts disclosed herein of steering light beams associated with optical devices may be applicable to other optical applications, such as electronic scanning devices.

The autochanger is a device that stores media pieces within a media library, not shown. The digital linear tape cartridge 600 is an example of a media piece that may be stored within an autochanger. When information stored on a specific media piece is required by a user, the autochanger moves the specific media piece from the library to a media player. Specifically, the autochanger uses the picker 100 to extract the media piece from the library and to place the media piece into a media player. Likewise, when a media piece located in a media player is no longer required by a user, the picker 100 extracts the media piece from the media player and inserts it into a specific location in the library.

Two of the many objectives in the design of autochangers are to maximize the number of media pieces that may be stored within the autochanger and to minimize human intervention required in the operation of the autochanger. These objectives may be accomplished, in part, by the bar code reader 200 integrated into the picker 100 as disclosed herein. Maximizing the number of media pieces that may be stored within the autochanger may be accomplished, in part, by minimizing the size of the components located in the autochanger and compacting the components together. Space within the autochanger originally dedicated to component storage may, instead, be dedicated to media storage. Maximizing the space available for media storage within the autochanger may also be accomplished, in part, by minimizing the amount of space that the picker 100 is required to occupy as it moves within the autochanger, thus, leaving more space available for media storage.

Limiting human intervention required in the operation of the autochanger may be accomplished, in part, by using bar codes, as are known in the art, to identify the media pieces stored within the autochanger. The bar code reader 200 may, as an example, be located within the picker 100 and may serve to read the bar codes affixed to the media pieces. The general location of the bar code reader 200 relative to a predetermined location within the autochanger may be known. Accordingly, when the bar code reader 200 reads the bar codes, the location of the media pieces to which the bar codes are affixed may be readily determined. The use of the bar codes, thus, eliminates the need for a user to manually input the identity and location of the media pieces stored within the autochanger and, thus, reduces the amount of human intervention required in the operation of the autochanger.

A conventional bar code reader generally comprises an illuminator and an imaging device. The illuminator emits an incident beam of light that serves to illuminate the bar code. The incident beam of light is sometimes referred to herein simply as an illumination beam. An image beam of light constituting an image of the bar code is reflected from the bar code and is converted to image data by the imaging device. In order to properly read the bar code, it is critical that the illumination beam and the image beam intersect at a common axis on the bar code.

A conventional bar code reader does not function properly when used within a picker unless the illuminating device and the imaging device are physically separated. The illuminating device and imaging device may be positioned at separate locations within the picker so that the illumination beam and the image beam intersect at a common axis on the bar codes affixed to the media pieces. Separating the illuminating device and the imaging apparatus, however, generally requires excessive space to be occupied by the bar code reader. Additionally, separating the illuminating device and the imaging device may require additional manufacturing costs to be incurred in the manufacture of autochangers because the illuminating device and the imaging device have to be aligned so their respective light beams intersect at the bar codes. The separate illuminating device and imaging device further require additional wiring to be located within the picker. The additional wiring is required to supply electric power and data lines to the separate illuminating device and imaging device, which further increases the complexity and cost of the autochanger.

Referring again to FIG. 1, the picker 100 disclosed herein integrates the bar code reader 200 into the picker 100, which is summarized below. The above-described problems associated with separating the illuminating device (referred to herein simply as the illuminator 200) from an imaging device 280 are overcome, in part, by affixing components of the illuminator 260 and the imaging device 280 to a single printed circuit board 210.

Figure 4:
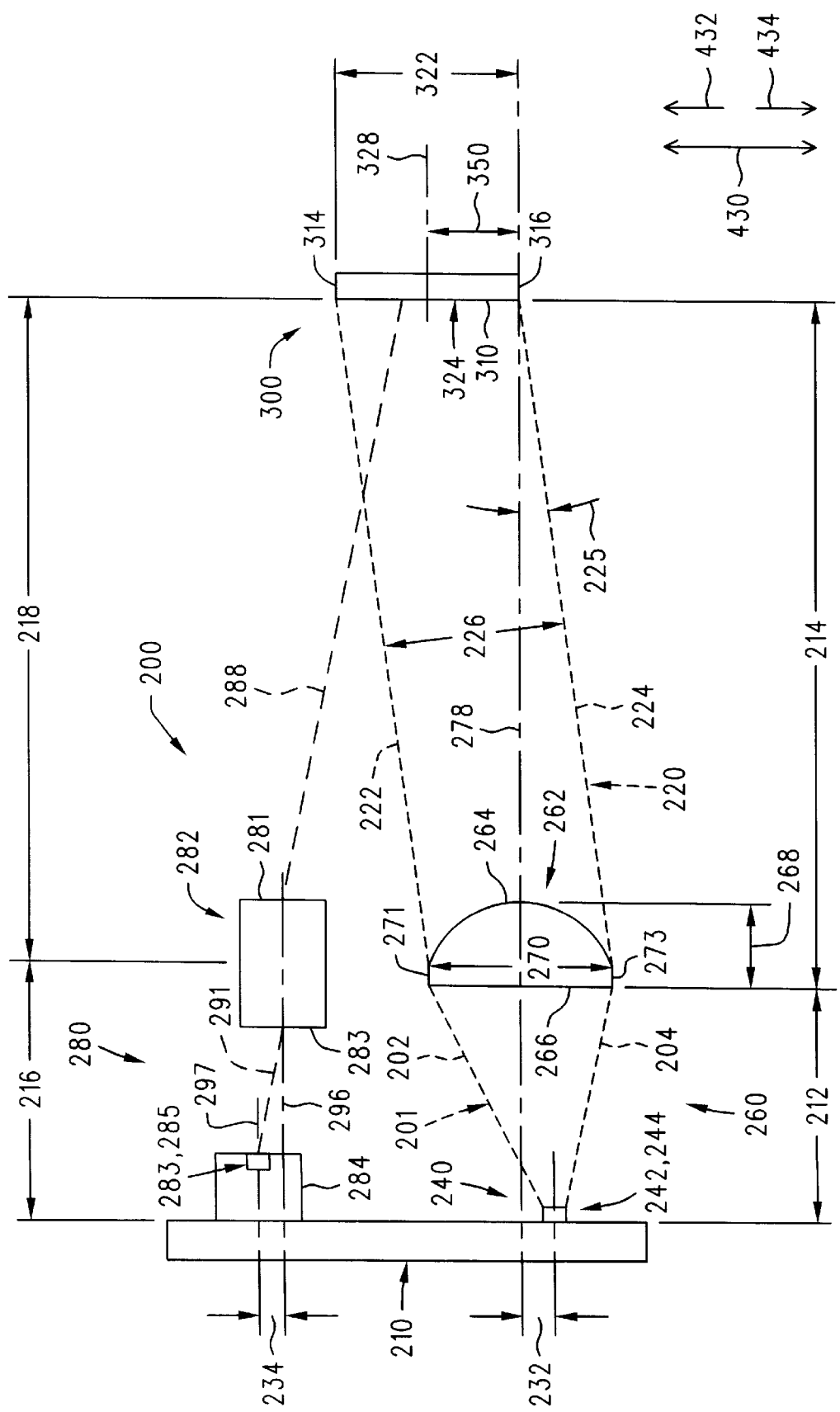
FIG. 4 is an enlarged top view of the bar code reader illustrated in FIG. 1.

The bar code reader 200 is summarized below. Referring to FIG. 4, the illuminator 260 may comprise a light source 240 and an illumination lens 262. The light source 240 may emit source beam 201 of light, which may be focused by the illumination lens 262 for form an illumination beam 220. The location of the illumination lens 262 relative to the light source 240 may be selected so as to steer the illumination beam 220 to intersect and, thus, illuminate a code label 300. The imaging device 280 may comprise a photosensor 284 and an imaging lens 282. The imaging lens 282 may serve to focus a first image beam 288 of light onto the photosensor 284 wherein the photosensor 284 may convert the image beam 288 to image data. The location of the imaging lens 282 relative to the photosensor 284 may be selected so as to steer the image beam 288 to intersect the bar code label 300. The illumination beam 220 and the image beam 288 may, thus, be appropriately steered so that they converge at a common location on the bar code label 300. This beam steering overcomes the above-described problems associated with locating a bar code reader within a picker.

Having thus summarized the autochanger, including the components thereof, the bar code reader 200, integrated into the picker 100, will now be described in detail. The picker 100 will be described herein as being adapted to operate with digital linear tape cartridges, of which, the digital linear tape cartridge 600 is an example. It is to be understood, however, that the description of the picker 100 operating with digital linear tape cartridges is for illustration purposes only, and that the picker 100 may be adapted to operate with other forms of media.

Except for the addition of the bar code reader 200, as will be described in further detail below, the autochanger and the components thereof, including the picker 100, may, for example, be of the type commercially available from the Hewlett-Packard Company and sold as Model Number HP 4226w or of the type described in either of the following U.S. Pat. No. 5,644,559 of Christie, et al., for FLIP LATCH ASSEMBLY FOR MEDIA AUTOCHANGER; and U.S. Pat. No. 5,682,096 of Christie, et al., for METHOD AND APPARATUS FOR MONITORING OPERATING POSITIONS OF A MEDIA AUTOCHANGER, which are both hereby incorporated by reference for all that is disclosed therein.

The autochanger and the components thereof are disclosed, in part, in the following U.S. Pat. applications Ser. No. 09/291,242 of Gardner et al. for GUIDANCE SYSTEM AND METHOD FOR AN AUTOMATED MEDIA EXCHANGER, filed on Apr. 13, 1999; Ser. No. 09/290,429 of Gardner et al. for IMAGING APPARATUS ALIGNMENT SYSTEM AND METHOD, filed on Apr. 13, 1999; Ser. No. 09/290,807 of Gardner for CALIBRATION SYSTEM FOR AN IMAGING APPARATUS AND METHOD, filed on Apr. 13, 1999; serial No. 09/290,428 of Kato et al. for METHOD OF DECIPHERING BAR CODES, filed on Apr. 13, 1999; Ser. No. 09/290,926 of Gardner, et al. for AUTOMATED OPTICAL DETECTION SYSTEM AND METHOD, filed on Apr. 13, 1999; Ser. No. 09/290,216 of Gardner for ALIGNMENT APPARATUS AND METHOD FOR AN IMAGING SYSTEM, filed on Apr. 13, 1999; and U.S. Pat. No. 6,118,598 of Gardner for METHOD AND APPARATUS FOR SETTING FOCUS IN AN IMAGING DEVICE; which are all hereby incorporated by reference for all that is disclosed therein.

FIG. 1 is top view of the picker 100 located in close proximity to the digital linear tape cartridge 600. The picker 100 may be a generally parallelepiped structure having a top side 110, a bottom side 112, not shown in FIG. 1, a front side 114, a back side 116, a left side 118, and a right side 120. The front side 114 may have an opening 130 that is appropriately sized to allow the digital linear tape cartridge 600 to pass through the opening 130 and into the interior of the picker 100 as will be described in detail below.

Figure 2:
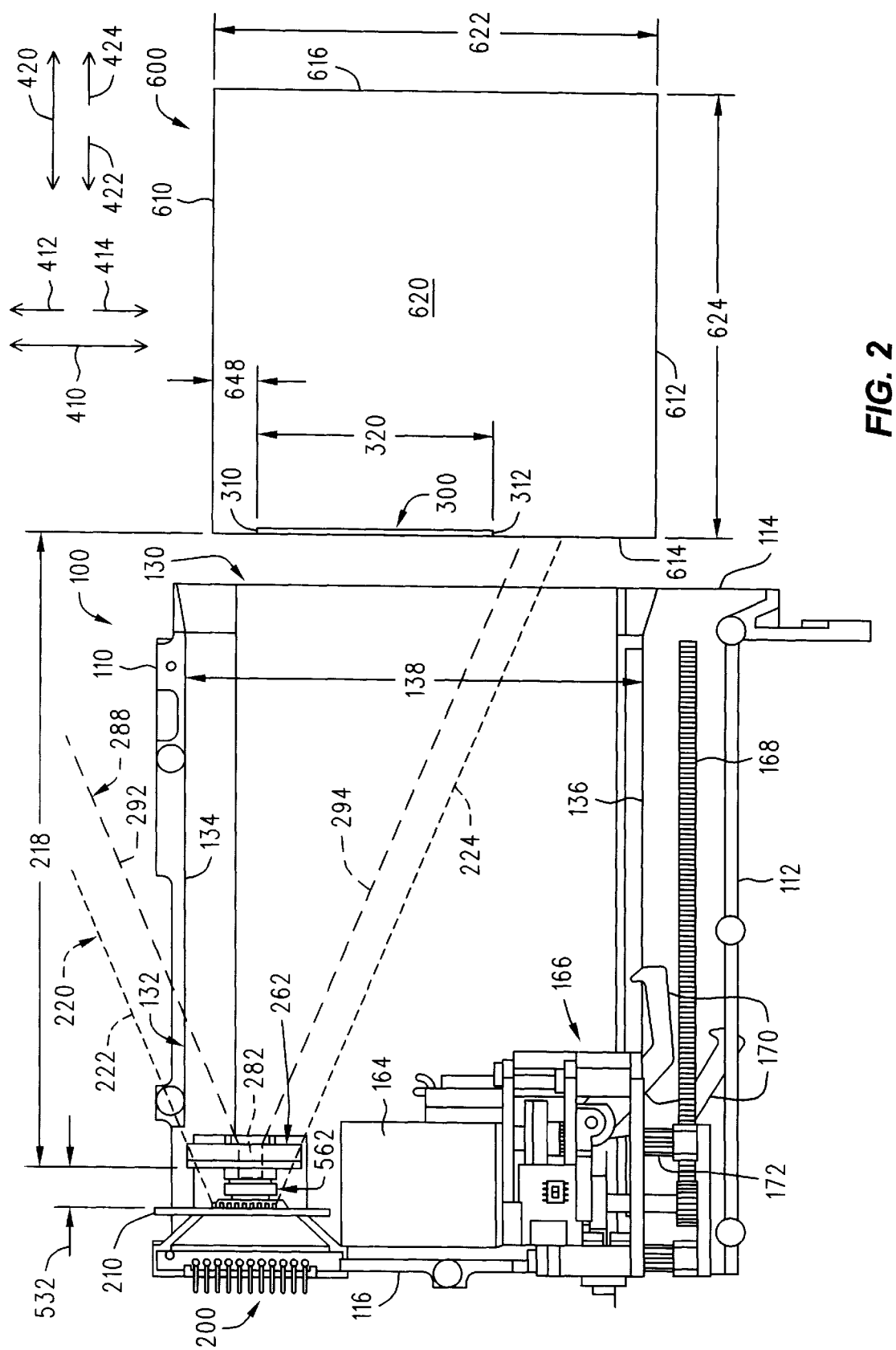
FIG. 2 is a side view of the media handler and the digital linear tape cartridge of FIG. 1.

The picker 100 may have a sleeve 132 located inside the picker 100. The sleeve 132 may serve to hold the digital linear tape cartridge 600 inside the picker 100. The sleeve 132 may have a left side 144, and a back side 148; the right side of the sleeve 132 may be the right side 120 of the picker 100. The sleeve 132 may have a width 140 extending between the sleeve left side 144 and the picker right side 120. The sleeve may have a depth 142 extending between the picker front side 114 and the sleeve back side 148. The width 140 and the depth 142 may be appropriately sized to hold the digital linear tape cartridge 600 inside the sleeve 132. Referring to FIG. 2, which is a side view of FIG. 1, the sleeve 132 may have a top side 134 and a bottom side 136. The sleeve 132 may have a height 138 extending between the sleeve top side 134 and the sleeve bottom side 136. Accordingly, the sleeve height 138 may be appropriately sized to hold the digital linear tape cartridge 600 within the sleeve 132.

A plunge motor 164, a picking mechanism 166, and a track 168 may also be located inside the picker 100. The plunge motor 164 may be operatively connected to the picking mechanism 166 in a conventional manner. The picking mechanism 166 may be operatively connected to a cog 172 and latches 170. The cog 172, through its association with the picking mechanism 166 may be operatively connected to the plunge motor 164 and may set in the track 168 in a conventional manner.

The plunge motor 164 may serve to rotate the cog 172 in the track 168, which, in turn, may cause the picking mechanism 166 to move. Specifically, the plunge motor 164 may serve to move the picking mechanism 166 in a negative plunge direction 422 and a positive plunge direction 424 depending on the rotational direction of the cog 172. The negative plunge direction 422 is a direction from the front side 114 of the picker 100 toward the back side 116. The positive plunge direction 424 is a direction from the back side 116 of the picker 100 toward the front side 114.

The picking mechanism 166 may serve to extract the digital linear tape cartridge 600 from the media library, not shown. The plunge motor 164, used in conjunction with the picking mechanism 166, may serve to move the picking mechanism 166 in the positive plunge direction 424 to a point where the latches 170 may attach to the digital linear tape cartridge 600 in a conventional manner. The digital linear tape cartridge 600 may, as an example, have notches, not shown, to which the latches 170 attach. The plunge motor 164 may then move the picking mechanism 166 in the negative plunge direction 422 to draw the digital linear tape cartridge 600 into the sleeve 132 of the picker 100.

A servo system, not shown, may be operatively attached to the picker 100 in a conventional manner. The servo system may serve to move the picker 100 in a vertical direction 410, a transverse direction 430, FIG. 1, and a plunge direction 420. Referring to FIG. 1, the transverse direction 430 may be a direction that extends along an axis that is approximately normal to the right side 120 of the picker 100. A positive transverse direction 432 may be defined as a transverse direction 430 extending from the right side 120 toward the left side 118 of the picker 100. A negative transverse direction 434 may be defined as a transverse direction 430 extending from the left side 118 toward the right side 120 of the picker 100. Referring to FIG. 2, the vertical direction 410 may be a direction that is parallel to an axis that is normal to the top side 110 of the picker 100. A positive vertical direction 412 may be a vertical direction 410 extending from the bottom side 112 toward the top side 110 of the picker 100. A negative vertical direction 414 may be a vertical direction 410 extending from the top side 110 toward the bottom side 112 of the picker 100. The plunge direction 420 has been summarized above with reference to the motion of the picking mechanism 166. The plunge direction 420 may be defined by an axis extending between the picker and the digital linear tape cartridge 600. A positive plunge direction 424 may be defined as a plunge direction 420 extending from the picker 100 toward the digital linear tape cartridge 600. A negative plunge direction 422 may be defined as a plunge director 420 extending from the digital linear tape cartridge 600 toward the picker 100.

Having described the components comprising the picker 100, the digital linear tape cartridge 600 will now be described in detail. The digital linear tape cartridge 600 may be a digital linear tape cartridge as is known in the art and is an example of one of many digital linear tape cartridges that may be stored within the autochanger. The digital linear tape cartridge 600 may be a generally parallelepiped structure having a top side 610, a bottom side 612, a front side 614, a back side 616, a right side 620 and a left side 618, not shown in FIG. 2. The digital linear tape cartridge 600 may have a height 622 extending between the top side 610 and the bottom side 612. The digital linear tape cartridge 600 may also have length 624 extending between the front side 614 and the back side 616. Referring briefly to FIG. 1, the digital linear tape cartridge 600 may have a width 626 extending between the left side 618 and the right side 620. The digital linear tape cartridge 600 may have a centerline 628, depicted by the reference line AA, extending the length 624 of the digital linear tape cartridge 600 and approximately centrally located between the left side 618 and the right side 620. The height 622, FIG. 2, the width 626, and the length 624 of the digital linear tape cartridge 600 may be appropriately sized so that the digital linear tape cartridge 600 may pass through the opening 130 in the front side 114 of the picker 100 and into the sleeve 132.

Figure 3:
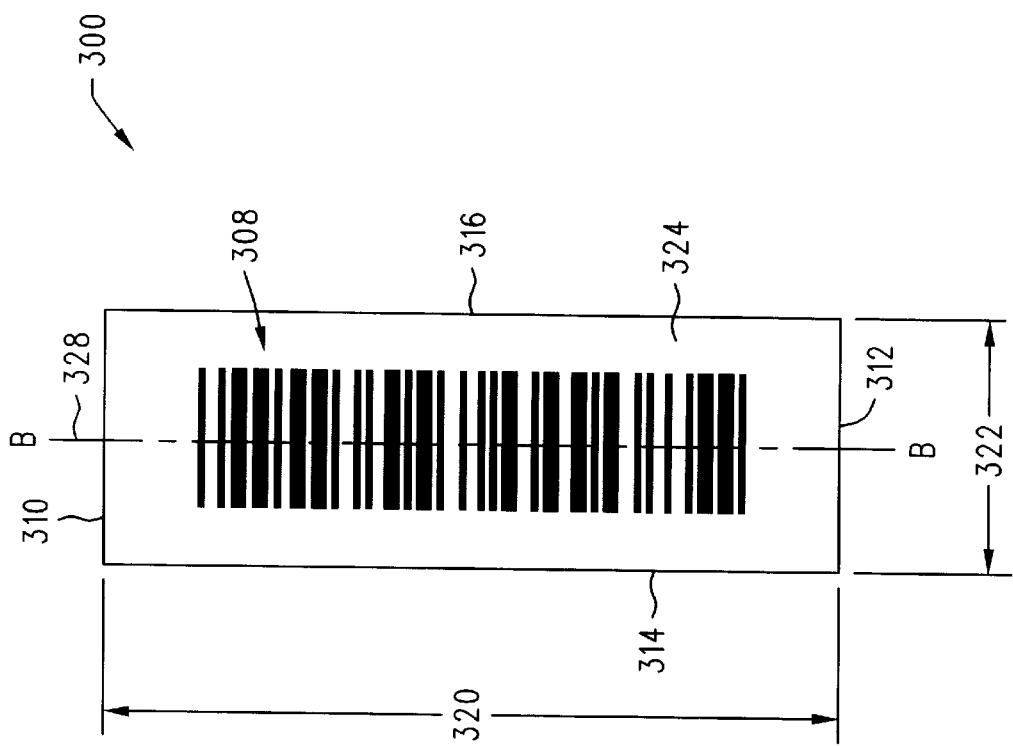
FIG. 3 is a front view of a bar code label.

A bar code label 300 may be affixed to the front side 614 of the digital linear tape cartridge 600. FIG. 3 illustrates a front view of the bar code label 300. The bar code label 300 may have a top side 310, a bottom side 312, a left side 314, and a right side 316. The bar code label 300 may have a length 320 extending between the top side 310 and the bottom side 312. The bar code label 300 may have a width 322 extending between the left side 314 and the right side 316. The bar code label 300 may have a centerline 328, depicted by the reference line BB, wherein the centerline 328 is approximately centrally located between the left side 314 and the right side 316. A surface 324 may be defined by the boundaries of the top side 310, the bottom side 312, the left side 314, and the right side 316. A bar code 308 may be printed onto the surface 324 in a conventional manner so as to be approximately centered on the surface 324.

The bar code 308 may be of the format that comprises a series of alternating reflective and nonreflective stripes. The reflective stripes are sometimes referred to herein as spaces and the nonreflective stripes are sometimes referred to herein as bars. These spaces and bars may have several predetermined widths, e.g., wide, medium, and narrow, however, the bar code 308 illustrated herein has either wide or narrow spaces and bars. The cumulation of spaces and bars on the bar code 308 depicted herein may represent a binary number wherein the individual spaces and bars may represent individual bits of the binary number. The widths of the spaces and bars may represent the values of the individual bits of the binary number, e.g., wide bars and spaces may represent ones and narrow bars and spaces may represent zeros. Selected groupings of the bits may represent predetermined characters, e.g., ASCII characters. One example of a bar code format that may be represented by the bar code 308 conforms to the industry standard, "Code 39" specification. The bar code reader, not shown in FIG. 3, may convert the image of the bar code 308 to image data as will be described below. The bar code reader may then "read" the bar code 308 by determining the widths of the spaces and bars and converting widths of the spaces and bars to their respective binary values. These binary values may be compared to a data base wherein the binary values are associated with alphanumeric characters per the Code 39 specification.

Referring again to FIG. 1, the bar code label 300 may be affixed to the digital linear tape cartridge 600 so that the centerline 328 of the bar code label 300, FIG. 3, intersects the centerline 628 of the digital linear tape cartridge 600. Referring again to FIG. 2, the bar code label 300 may be affixed to the front side 614 of the digital linear tape cartridge 600 so that the top side 310 of the bar code label 300 is located a distance 648 from the top side 610 of the digital linear tape cartridge 600.

In order to properly read the bar code 308, it is critical that the bar code reader be able to distinguish the reflective spaces from the nonreflective bars that comprise the bar code 308. Accordingly, when the bar code 308 is illuminated by the bar code reader, the preferred illumination of the bar code 308 is an illumination pattern wherein the bar code 308 is uniformly illuminated. Uniform illumination causes light to reflect from the bar code 308 wherein the intensity of reflected light represents the reflectivity of the surface from which the light reflected and this representation is maintained substantially constant throughout the bar code 308. A nonuniform illumination pattern may cause a reflective space at one end of the bar code 308 to reflect a substantially equal intensity of light as a nonreflective bar on the other side of the bar code 308. In this case, the bar code reader will be unable to distinguish the spaces from the bars and, thus, the bar code reader will not be able to read the bar code 308.

Having described the picker 100 and the digital linear tape cartridge 600, the bar code reader 200 will now be described. The following description will include a description of the bar code reader 200 located within the picker 100 and the association between the bar code reader 200 and the digital linear tape cartridge 600.

The bar code reader 200 is illustrated in detail in FIG. 4, which is a top view of the bar code reader 200 associated with the bar code label 300. For illustration purposes, FIG. 4 illustrates the bar code reader 200 separate from the picker. The bar code reader 200 may have an illumination device 260, referred to herein simply as an illuminator 260, and an imaging device 280. The illuminator 260 may serve to illuminate the bar code label 300. The imaging device 280 may serve to generate an image of the bar code label 300 and may convert the image of the bar code 308, FIG. 3, to image data.

Figure 5:
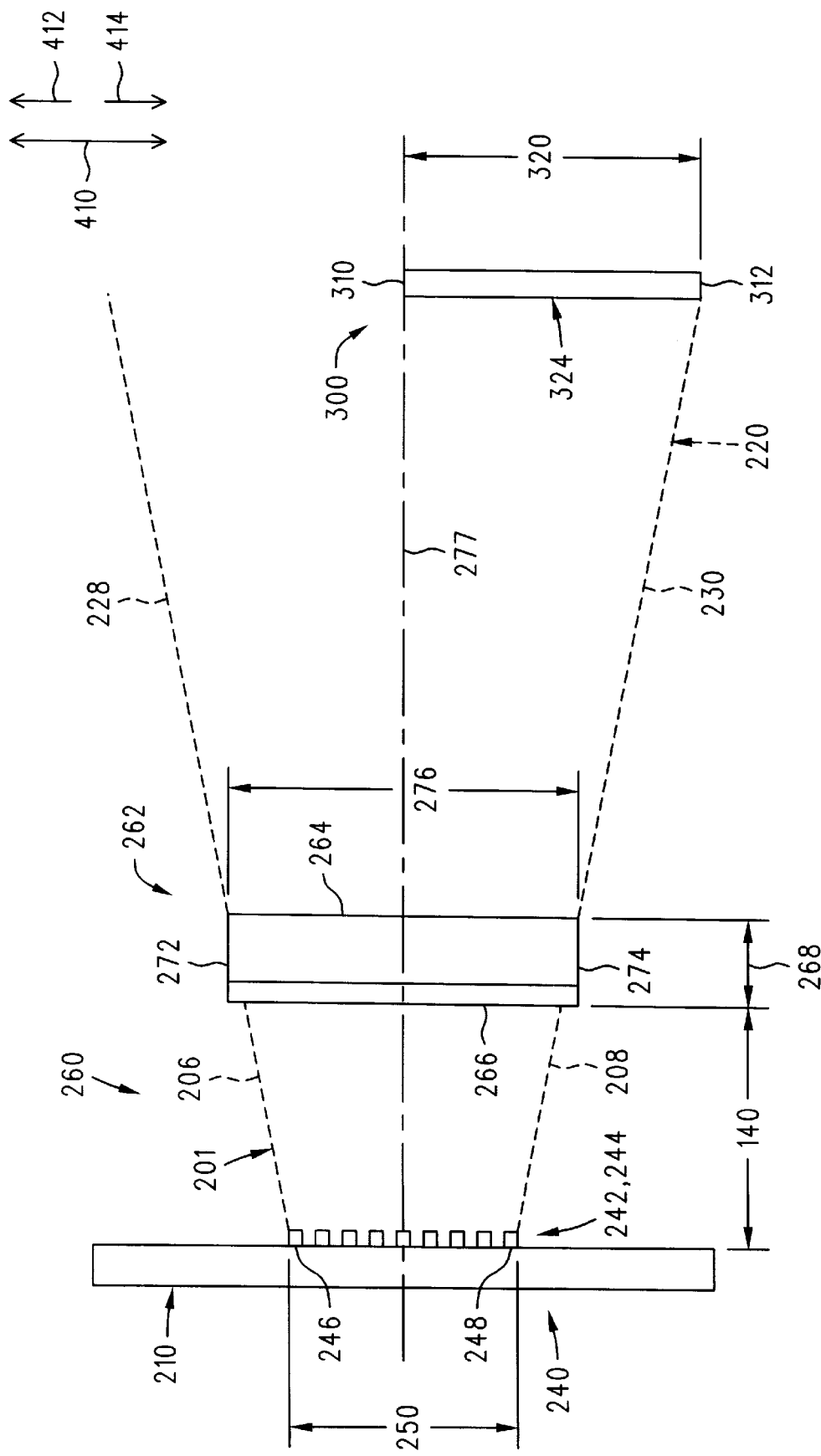
FIG. 5 is a side view of the bar code illuminator of FIG. 4.

FIG. 5 is a side view of the bar code reader 200 of FIG. 4 illustrating the illuminator 260 associated with the bar code label 300. For illustration purposes, the imaging device is not illustrated in FIG. 5. The illuminator 260 may comprise a light source 240 and an illumination lens 262. The light source 240 may comprise a linear array 242 of light-emitting diodes 244 (referred to herein simply as LEDs) mounted to a circuit board 210. The array 242 of LEDs 244 may have a first LED 246 and a last LED 248. The array 242 may have a length 250 extending between the first LED 246 and the last LED 248. The circuit board 210 may be a rigid printed circuit board as is known in the art. The circuit board 210 may serve as a physical support for the LEDs 244, in addition, the circuit board 210 may serve as a vehicle to conduct electrical current to the LEDs 244.

The illumination lens 262 may be of the type known in the art as a collimating lens, e.g., a plano-convex rectangular cylindrical lens. The illumination lens 262 may have a convex surface 264 and a planar surface 266. Additionally, the illumination lens 262 may have a first end 272 and a second end 274. The widest distance between the convex surface 264 and the planar surface 266 may define a width 268 of the illumination lens 262. The illumination lens 262 may also have a height 276 extending between the first end 272 and the second end 274.

Referring again to FIG. 4, the illumination lens 262 may have a top side 271, a bottom side 273, and a length 270 extending between the top side 271 and the bottom side 273. The illumination lens 262 may have a focal plane 278 as is known in the art. For illustration purposes, the focal plane 278 is illustrated extending approximately through the midpoints of the convex surface 264 and the planar surface 266. The view of FIG. 4 illustrates a side view of the focal plane 278. Thus, the view of the focal plane 278 illustrated in FIG. 4 is a line, similar to an optical axis. The focal plane 278 is an optical reference that will be used to determine the location of the light source 240 relative to the lens 262 as described below.

Figure 6:
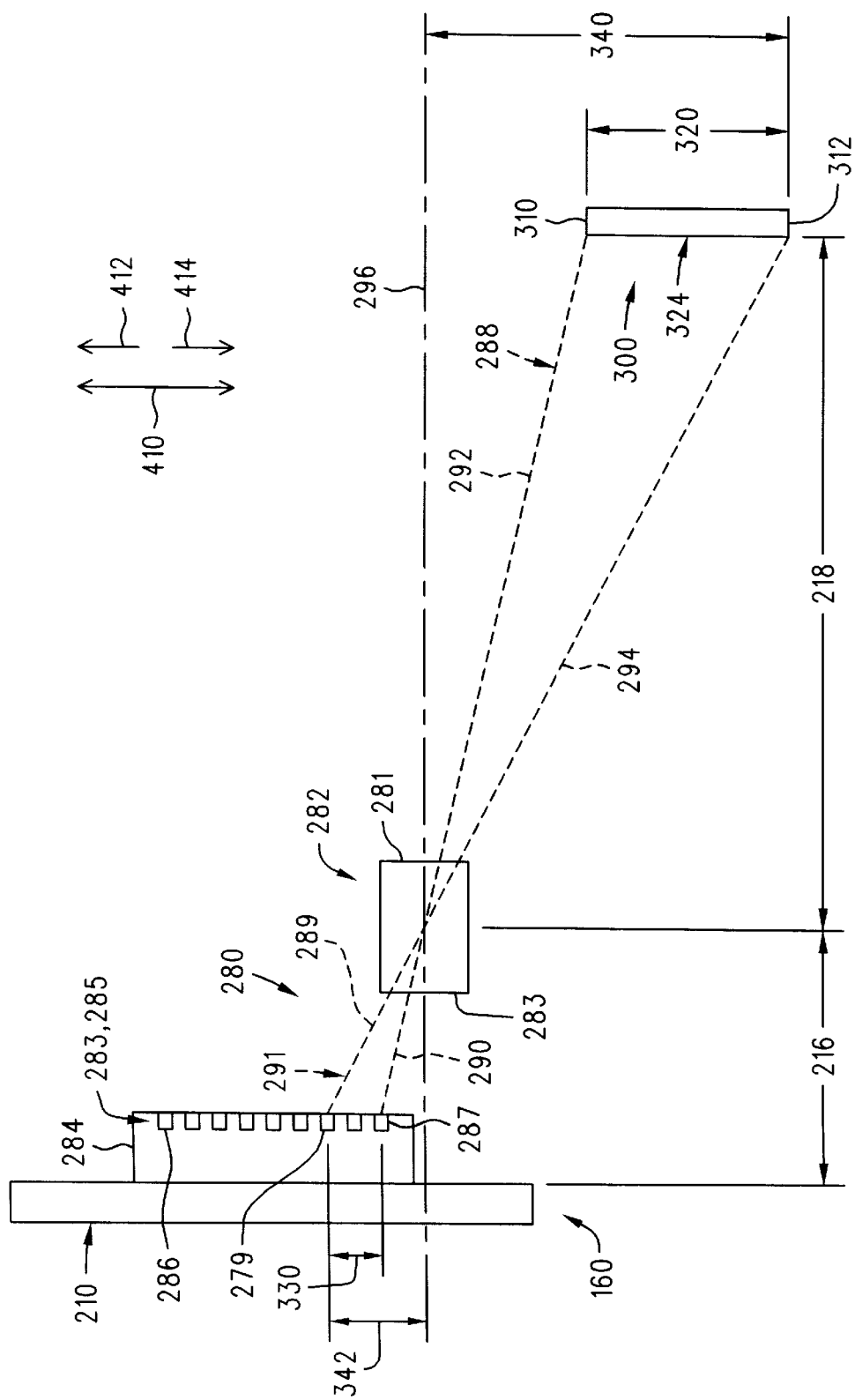
FIG. 6 is a side view of the bar code imaging device of FIG. 4.

FIG. 6 is a side view of the bar code reader 200 of FIG. 4 illustrating the imaging device 280 associated with the bar code label 300. For illustration purposes, the illuminator is not illustrated in FIG. 6. The imaging device 280 may comprise an imaging lens 282 associated with a photoelectric device 284, referred to herein simply as the photosensor 284. The photosensor 284 may be a charge-coupled device as is known in the art and may be operatively connected to the circuit board 210. The photosensor 284 may comprise a linear array 283 of photodetectors 285 extending between a first photodetector 286 and a last photodetector 287. The photosensor 284 may comprise approximately 2,700 photodetectors 285 wherein each photodetector 285 has a width of approximately 11 microns. The photodetectors 285 illustrated in FIG. 6 have been greatly enlarged for illustration purposes. The photodetectors 285 and, thus, the photosensor 284 may be best able to convert a specific frequency band of light to image data. One example of a commercially available photosensor 284 is sold by the NEC Corporation as model number 3734ACY.

The photosensor 284 may be operatively attached to the circuit board 210. The circuit board 210 may serve as a structural support device for the photosensor 284. Additionally, the circuit board 210 may serve as a vehicle to provide electric current and data lines to the photosensor 284.

Referring again to FIG. 4, the photosensor 284 may have an imaging axis 297. The imaging axis 297 defines the light path entering the photosensor 284 that yields the optimum performance of the photosensor 284. The imaging axis 297 described herein may extend through the photodetectors 285 and may be perpendicular to the board 210.

The imaging lens 282 may be of the type commonly known in the art as a Cooke triplet. The imaging lens 282 may have a first side 281 and a second side 283. The lens 282 may have an optical axis 296 extending through the lens 282 as is known in the art. The imaging lens 282 may also have a focal plane wherein the focal plane is defined as being parallel to the array of photodetectors 285. The focal plane as illustrated herein appears as the line depicted by the optical axis 296 when viewed from the side view of FIG. 4. The focal plane and the optical axis will be used below to align the imaging lens 282 to the photosensor 284.

The imaging lens 282 may be located an image distance 216 from the photosensor 284. The imaging lens 282 may be located a target distance 218 from the bar code label 300. It is to be understood that the target distance 218 may vary as the picker 100, FIG. 1, moves relative to the digital linear tape cartridge 600. The planar surface 266 of the illumination lens 262 may be located a source distance 212 from the printed circuit board 212. In the event that the LEDs 244 extend a substantial distance from the circuit board 212, the source distance 212 may extend between the planar surface 266 of the illumination lens 262 and the LEDs 244. The source distance 212, as will be described below, affects the width 226 and collimation of the illumination beam 220. The planar surface 266 of the imaging lens 262 may be located an illumination distance 214 from the bar code label 300.

Having described the components of the bar code reader 200, the operation of the bar code reader 200 will be described. The following description focuses on the bar code reader 200 exclusively. A description of the bar code reader 200 integrated into the picker 100, FIG. 1, will be described further below. Referring to FIG. 4, the LEDs 244 in the array 242 emit a source beam 201 of light. The frequency of light constituting the source beam 201 is in the frequency band that is best able to be converted to image data by the photosensor 284. The source beam 201 will be described herein as being bounded by a first edge 202 and a second edge 204. The first edge 202 and the second edge 204 of the source beam 201 may converge at the array 242 of LEDs 244 and may diverge from the array 242. The first edge 202 may extend from the array 242 to the top side 271 of the lens 262. The second edge 204 may extend from the array 242 to the bottom side 273 of the lens 262.

The purpose of the lens 262 is to collimate the source beam 201 in the one dimension as viewed from FIG. 4. The result of collimating the source beam 201 may be an illumination beam 220 that has a substantially uniform width in the dimension illustrated in FIG. 4. The illumination beam 220 may be substantially fan-shaped when viewed from the dimension illustrated in FIG. 5. Referring again to FIG. 4, the illumination beam 220 will be described herein as being bounded a first edge 222 and a second edge 224. The first edge 222 may originate from the vicinity of the top side 271 of the lens 262 and the second edge 224 may originate from the vicinity of the bottom side 273 of the lens 262. The illumination beam 220 may have a width 226 extending between the first edge 222 and the second edge 224. Collimating the illumination beam 220 concentrates the light energy emitted by the LEDs 244 in the one dimension illustrated in FIG. 4 and provides substantially uniform illumination of the bar code 308, FIG. 3.

FIG. 5 illustrates the fan shapes of the source beam 201 and the illumination beam 220. The source beam 201 illustrated in FIG. 5 will be described herein as being bounded by a third edge 206 and a fourth edge 208. The third edge 206 may extend from the first LED 246 to the vicinity of the first end 272 of the illumination lens 262. The fourth edge 208 may extend from the last LED 248 to the vicinity of the second end 274 of the illumination lens 262. The illumination beam 220 illustrated in FIG. 5 will be described herein as being bounded by a third edge 228 and a fourth edge 230. The third edge 228 may originate from the vicinity of the first end 272 of the illumination lens 262 and the fourth edge 230 may originate from the vicinity of the second end 274 of the illumination lens 262. A centerline 277 may be used as a reference to align objects relative to the illumination lens 262. The centerline 277 may be approximately centrally located between the third edge 228 and the fourth edge 230. The light source 240 illustrated herein is a linear source, however, the source beam 201 may diverge slightly from the light source 240. Accordingly, the illumination beam 220 may also diverge from the illumination lens 262. The intensity of light in the illumination beam 220 may be substantially uniform between a point on the third edge 228 and a point on the fourth edge 230 wherein the first point and the second point are equal distances from the lens 262.

Having thus described the illuminator 260, the imaging device 280, FIG. 4, will now be described. The imaging device 280 will be described as receiving light from a first image beam 288. The imaging lens 282 serves to focus the first image beam 288 to form a second image beam 291, which is focused onto the phodetectors 285 located on the photosensor 284. The first image beam 288 and the second image beam 291 may, when viewed from the top view illustrated in FIG. 4, be approximately as narrow as the photodetectors 285, e.g., 11 microns. For the purpose of illustration, however, the first image beam 288 and the second image beam 291, when viewed from the top view illustrated in FIG. 4, will be depicted herein as being lines. The first image beam 288 may originate from the surface 324 of the bar code label 300 and may terminate at the intersection of the first side 281 of the imaging lens 282 and the optical axis 296. The second image beam 291 may originate at the intersection of the second side 283 of the imaging lens 282 and optical axis 296 and may terminate at the photodetectors 285 on the photosensor 284. The first image beam 288 and the second image beam 291 may be images of the surface 324 of the bar code label 300, including the bar code, not illustrated in FIG. 4.

FIG. 6 illustrates a side view of the imaging device 280. The first image beam 288, when viewed from the dimension of FIG. 6 may be fan-shaped wherein the first image beam 288 is narrowest at the imaging lens 282. The second image beam 291, when viewed from side view illustrated in FIG. 6, may also be fan-shaped wherein the second image beam 291 is also narrowest at the imaging lens 282. The first image beam 288 will be described herein, when viewed from the side view illustrated in FIG. 6 as being bounded by a first edge 292 and a second edge 294. The first edge 292 may extend between the imaging lens 282 and the top side 310 of the bar code label 300. The second edge 294 may extend between the imaging lens 282 and the bottom side 312 of the bar code label 300. Accordingly, the first image beam 288 may encompass the entire bar code label 300. The second image beam 291 will be described herein, when viewed from the side view illustrated in FIG. 6, as being bounded by a third edge 289 and a forth edge 290. The third edge 289 may extend from the second side 283 of the imaging lens 282 to a target photodetector 279. The forth edge 290 may extend from the second side 283 of the imaging lens 282 to the last photodetector 287. The distance between the target photodetector 279 and the last photodetector is defined herein as an image height 330. The bar code label 300 is, thus, focused onto the photosensor 284 between the target photodetector 279 and the last photodetector 287. The photodetectors 285 may serve to convert the image constituting the second image beam 291, e.g., the bar code, to image data.

Having described the components comprising the bar code reader 200, FIG. 4, the bar code reader 200 will now be described reading the bar code 308, FIG. 3, located on the surface 324 of the bar code label 300. In summary, the illumination beam 220, FIG. 4, illuminates the bar code, not illustrated in FIG. 4, and the photosensor 284, via the second illumination beam 291, generates image data representative of the bar code. The illumination beam 220 illustrated herein may be steered in the positive transverse direction 432 relative to the focal plane 278 so as to intersect the bar code. Steering the illumination beam 220 is accomplished by offsetting the light source 240 a source offset distance 232 in the negative transverse direction 434 relative to the focal plane 278. The first image beam 288 may be steered in the negative transverse direction 434 relative to the optical axis 296 to intersect the bar code. Steering the first image beam 288 is accomplished by offsetting the imaging axis 297 of the photosensor 284 in the positive transverse direction 432 relative to the optical axis 296 of imaging lens 282. Referring briefly to FIG. 6, the first image beam 288 may also be steered in the negative vertical direction 414 relative to the optical axis 296. This steering is accomplished by offsetting the location of the photosensor 284 in the positive vertical direction 412 relative to the optical axis 296. Steering the light beams may be necessary when the light source 240 and the photosensor 284 are affixed to the same circuit board 210. If the light beams are not steered appropriately, they may extend parallel to each other and may not converge on the bar code label 300. The bar code, thus, may not be able to be read.

Referring to FIG. 4, steering the illumination beam 220 may be necessary when the focal plane 278 of the imaging lens 262 would not otherwise intersect the bar code. The top view of the bar code reader 200 of FIG. 4 illustrates the centerline 328 of the bar code label 300 displaced a transverse offset 350 in the positive transverse direction 432 relative to the focal plane 278 of the imaging lens 262. For illustration purposes, the transverse offset 350 is illustrated as being half the width 322 of the bar code label 300. The first edge 222 of the illumination beam 220 is illustrated extending between the top side 271 of the lens 262 and the left side 314 of the bar code label 300. The second edge 224 of the illumination beam 220 is illustrated extending between the bottom side 273 of the lens 262 and the right side 316 of the bar code label 300. The width 226 of the illumination beam 220 is illustrated herein as being appropriately sized so that it extends the width 322 of the bar code label 300. It is to be understood, however, that the illumination beam 220 only needs to illuminate the bar code 308, FIG. 3, and not the entire bar code label 300. For the purpose of illustration, however, the illumination beam 200 described herein is depicted as illuminating the entire bar code label 300.

Steering the illumination beam 220 in the positive transverse direction 432 is accomplished by locating the array 162 of LEDs 164 a source offset 232 in the negative transverse direction 434 relative to the focal plane 278 of the imaging lens 262. The amount of the transverse offset 350 is a function of the amount of the source offset 232 in addition to the optical characteristics of the imaging lens 262. Calculating the proper source offset 232 that is required to accomplish a desired transverse offset 350 may be calculated by tracing the source beam 201 and the illumination beam 220 through the lens 262. Calculating the proper source offset 232 may also be determined by using software programs that are designed to trace beam patterns through lenses. One example of such a software program is commercially available from the Sinclair Optics Corporation of Fairport, New York and is sold as the OSLO program. An example of steering the illumination beam 220 using the source offset 232 is described below.

FIG. 5 illustrates the bar code label 300 offset in the negative vertical direction 414 relative to the centerline 277 of the lens 262. For ease in describing the illumination process, the bar code label 300 is illustrated being offset in the negative vertical direction 414 so that the centerline 277 intersects the top side 310 of the bar code label 300. The fourth edge 230 of the illumination beam 220 is illustrated intersecting the bottom side 312 of the bar code label 300. The length 320 of the bar code label 300 is, thus, illuminated by the illumination beam 220. Because the light intensity in the illumination beam 220 is substantially uniform, the surface 324 of the bar code label 300 will be uniformly illuminated. In this illustration, only half of the illumination beam 220 is illuminating the bar code label 300. The light source 240 may be sufficiently intense so that the bar code reader may operate properly when only half of the illumination beam 220 illuminates the bar code label 300.

Referring again to FIG. 4, the first image beam 288 is illustrated as being steered in the negative transverse direction 434 relative to the optical axis 296 of the imaging lens 282. This steering is accomplished by locating the optical axis 296 an image offset 234 in the negative transverse direction 434 relative to the imaging axis 297 of the photosensor 284. Offsetting the first image beam 288 is required so that the first image beam 288 may intersect the region of the bar code label 300 that is illuminated by the illumination beam 220. The amount of the image offset 234 required to accomplish the desired beam steering of the first image beam 288 may be calculated using optical formulas or by using a program such as the OSLO program described above.

Referring again to FIG. 6, the bar code label is illustrated as being located in the negative vertical direction 414 relative to the optical axis 296 of the imaging lens 282. Specifically, the bar code label 300 is illustrated herein as being located so that the bottom side 312 is located a first vertical distance 340 from the optical axis 296. This location of the bar code label 300 will cause the image of the bottom side 312 of the bar code label 300 to be located a second vertical distance 342 from the optical axis. The second vertical distance 342 is equal to the magnification of the imaging lens 282 multiplied by the first vertical distance 340.

Having described the bar code reader 200, the picker 100, FIG. 2, will now be described incorporating the bar code reader 200. The bar code reader 200 may be located in the vicinity of the back side 116 of the picker 100. This location for the bar code reader 200 within the picker 100 does not interfere with the operation of the plunge motor 164 or the picking mechanism 166. Additionally, this location for the bar code reader 200 will not interfere with a digital linear tape cartridge that may be located in the sleeve 132 of the picker 100.

Referring to FIG. 1, the LEDs 244 and the photosensor 284 both may be operationally attached to the circuit board 210. The circuit board 210 may be a substantially rigid structure that is secured to the picker 100 in a conventional manner. Likewise, the illumination lens 262 and the imaging lens 282 may be affixed to a structure, not shown, that also may be secured to the picker 100 in a conventional manner. The structure securing the illumination lens 262 and the imaging lens 282 to the picker 100 may allow them to be moved individually relative to the circuit board 210. This movement functions as an adjustment that allows the illumination beam 220 and the first image beam 288 to be steered to predetermined positions, e.g., the bar code label 300.

The illumination beam 220 and the first image beam 288 illustrated in FIG. 1 have been steered so that they pass through the approximate center of the opening 130 in the picker 100 and intersect the bar code label 300 at approximately the centerline 628. This steering of the beams allows the bar code reader 200 to read the bar code located on the digital linear tape cartridge 600 when the picker 100 is in the proper transverse position 430 to properly contact the digital linear tape cartridge 600. Accordingly, the picker 100 does not have to move in the transverse direction 430 any amount greater than that required to properly contact the digital linear tape cartridge 600 for the bar code reader to read the bar code affixed to the digital linear tape cartridge 600. The autochanger, thus, does not waste any space by requiring the picker 100 to travel any further in the transverse direction 430 than is required for the bar code reader 200 to read bar codes affixed to digital linear tape cartridges.

An example of offsetting the illumination beam 220 and the first image beam 288 will now be described in detail. The illumination lens 262 used in this example is commercially available as model number 44010 from the Oriel Company of Stratford, Connecticut. The illumination lens 262 may have a length 276, FIG. 5, equal to 63.5 mm and a width 268 equal to 16.4 mm. The radius of the curve of the convex surface 264 may be equal to 38.1 cm and the nominal focal length may be equal to 25 mm.

Referring to FIG. 4, in this example, the illumination distance 214 is equal to 140 mm and a transverse offset 350 of 14 mm in the positive transverse direction 432 needs to be realized. The aforementioned parameters of the lens 262 along with the illumination distance 214 and the transverse offset 350 may be input to a lens analysis program to determine the source distance 212 and the source offset 232. Using the aforementioned program or other analysis of the required parameters, the array 242 of LEDs 244 is calculated as being required to be located a source distance 212 of 23.41 mm from the planar surface 266 of the illumination lens 262. Likewise, the source offset 232 is calculated to be 2.54 mm. Thus, the focal plane 278 is required to be located 2.54 mm in the negative transverse direction 434 from the array 242 of LEDs 244.

The imaging lens 282 may also have to be offset to steer the first image beam 288 to intersect the bar code label 300. For the purposes of illustrating this example, the imaging lens 282 may be depicted as being a Cooke triplet with a magnification of 0.244. Additionally, for illustration purposes, the first image beam 288 will be depicted herein as being required to intersect the bar code label 300 16.3 millimeters from the optical axis 296. The image offset 234 is equal to seven millimeters multiplied by the magnification of the imaging lens 282, which has been established as 0.244. Accordingly, the image offset 234 is equal to 3.98 mm, meaning that the imaging axis 297 of the photosensor 284 needs to be located 3.98 mm in the positive transverse direction 432 relative to the optical axis 296.

Referring again to FIG. 6, the bar code label 300 may be offset in the negative vertical direction 414 by the first vertical distance 340. For the purpose of this example, the bar code label will have a height 320 of 35 mm and the first vertical distance will be 40 mm. Through optical equations, the image height 330 is equal to the height 320 of the bar code label 300 multiplied by the magnification of the imaging lens 282 (35 mm multiplied by 0.244), which is equal to 8.54 mm. The second vertical distance 342 is equal to the first vertical distance 340 (40 mm) multiplied by the magnification of the imaging lens 282, which equals 9.76 mm. The optical axis 296 needs to be located the difference between the second vertical distance 342 and the image height 330 from the last photodetector 287. Accordingly, the optical axis 296 needs to be located 1.22 mm in the negative vertical direction 414 from the last photodetector 287.

Having thus described the components comprising the picker 100 and the digital linear tape cartridge 600, the operation of the picker 100, including the bar code reader 200, will now be described. The picker 100 serves to transport digital linear tape cartridges, of which the digital linear tape cartridge 600 is an example, between a library and media players located in the autochanger, not shown. The process of reading the bar code label 300 affixed to the digital linear tape cartridge 600 requires the picker 100 to be located adjacent to the digital linear tape cartridge 600 as illustrated in FIGS. 1 and 2.

Referring to FIG. 1, the servo system, previously described, but not shown, moves the picker 100, in a conventional manner, to a transverse position 430 where the picker 100 is adjacent to the digital linear tape cartridge 600. The picker 100 is located so that the centerline 628 of the digital linear tape cartridge 600 is approximately located so as to intersect the approximate center of the opening 130 in the picker 100. Referring to FIG. 2, the servo system also moves the picker 100, in a conventional manner, in the vertical direction 410 to where the top side 610 of the digital linear tape cartridge 600 is approximately located at the same vertical position 410 as the top side 134 of the sleeve 132. At this position, the picking mechanism 164 may move in the positive plunge direction 424 to extract the digital linear tape cartridge 600.

The bar code reader 200, as described above, generates an image of the bar code label 300 and deciphers the bar code. When the bar code is read, the autochanger may compare the information encoded on the bar code to stored data to determine the contents of the digital linear tape cartridge 600. Should the autochanger require the digital linear tape cartridge 600 to be located in a media player, the plunge motor 164 may move the picking mechanism 188 in the positive plunge direction 424 so the latches 170 may attach to the digital linear tape cartridge 600. The plunge motor 164 may then move in the negative plunge direction 422 to draw the digital linear tape cartridge into the sleeve 132. The picker 100 may then move to the vicinity of a media player where the picker 100 may insert the digital linear tape cartridge 600 into the media player in a conventional manner.

The optical assembly has been described herein as being used in a bar code reader application. It is to be understood that this description is for illustration purposes only and that the optical assembly may be used in other applications, such as electronic scanning devices.

It is contemplated that the inventive concepts herein described may be variously otherwise embodied and it is intended that the appended claims be constructed to include alternative embodiments of the invention except insofar as limited by the prior art.

What is claimed is:

1. An optical assembly for acquiring an image of an object, said optical assembly comprising:
   a photosensor array;
   an imaging light path extending between said object and said photosensor array;
   an imaging lens located along said imaging light path, said imaging lens having an imaging lens optical axis associated therewith;
   wherein said imaging lens optical axis is spaced a first distance from said photosensor array in a direction normal to said imaging lens optical axis.

2. The optical assembly of claim 1 wherein said imaging lens optical axis is spaced a second distance from said object in a direction normal to said imaging lens optical axis.

3. The optical assembly of claim 1 wherein said photosensor array is a linear photosensor array.

4. The optical assembly of claim 1 wherein said first distance is between about 3.5 millimeters and about 4.5 millimeters.

5. The optical assembly of claim 1 and further comprising:
   a light source;
   an illumination light path extending from said light source to said object;
   an illumination lens located along said illumination light path, said
   illumination lens having an illumination lens optical axis associated therewith;
   wherein said illumination lens optical axis is spaced a third distance from said light source in a direction normal to said illumination lens optical axis.

6. The optical assembly of claim 5, further comprising a substrate and wherein both said photosensor array and said light source are mounted to said substrate.

7. The optical assembly of claim 6 wherein said substrate is a substantially rigid substrate.

8. The optical assembly of claim 5 wherein said illumination lens optical axis is spaced a fourth distance from said object in a direction normal to said illumination lens optical axis.

9. The optical assembly of claim 5 wherein said third distance is between about 2.4 millimeters and about 2.6 millimeters.

10. The optical assembly of claim 1 wherein said object is a bar code and said optical assembly is a bar code reader.

11. An optical assembly for acquiring an image of an object, said optical assembly comprising:
    a light source;
    an illumination light path extending between said light source and said object;
    at least one illumination lens located along said illumination light path, said at least one illumination lens having an illumination lens optical axis associated therewith;
    wherein said illumination lens optical axis is spaced a first distance from said light source in a direction normal to said illumination lens optical axis.

12. The optical assembly of claim 11 wherein said illumination lens optical axis is spaced a second distance from said object in a direction normal to said illumination lens optical axis.

13. The optical assembly of claim 11 wherein said first distance is between about 2.4 millimeters and about 2.6 millimeters.

14. A method of imaging an object, said method comprising:
    providing a photosensor array;
    providing an imaging lens, said imaging lens having an imaging lens optical axis associated therewith, wherein said imaging lens optical axis is spaced a first distance from said photosensor array in a direction normal to said imaging lens optical axis;
    locating said photosensor array relative to said object such that said photosensor array is spaced from said object in a direction normal to said imaging lens optical axis;
    imaging said object with said photosensor array by directing a light path from said object through said imaging lens to said photosensor array.

15. The method of claim 14 wherein said photosensor array is a linear photosensor array.

16. The method of claim 14 wherein said first distance is between about 3.5 millimeters and about 4.5 millimeters.

17. The method of claim 14 and further comprising:
    providing a light source;
    providing an illumination lens, said illumination lens having an illumination lens optical axis associated therewith, wherein said illumination lens optical axis is spaced a second distance from said light source in a direction normal to said illumination lens optical axis;

illuminating said object with said light source by directing a light path from said light source through said illumination lens to said object.

18. The method of claim 17 further comprising providing a substrate having a substantially planar surface formed thereon; and wherein said providing a photosensor array comprises providing said photosensor array mounted to said substantially planar surface; and said providing a light source comprises providing said light source mounted to said substantially planar surface in spaced relation to said photosensor array.

19. The method of claim 18 wherein said substrate is a substantially rigid substrate.

20. The method of claim 17 wherein said second distance is between about 2.4 millimeters and about 2.6 millimeters.

21. The method of claim 14 wherein said object is a bar code.

* * * * *